United States Patent

[11] 3,552,442

[72] Inventor John G. Knowles
 1018 Fox Chase Road, Philadelphia, Pa.
 19111
[21] Appl. No. 764,232
[22] Filed Oct. 1, 1968
[45] Patented Jan. 5, 1971

[54] SECTIONAL SLEEVE VALVE
 4 Claims, 3 Drawing Figs.

[52] U.S. Cl. .................................................... 137/625.69
[51] Int. Cl. .................................................... F16k 11/07
[50] Field of Search ........................................... 137/625.66
 (Cursory), 625.68(Cursory), 625.69(Cursory);
 251/324(Cursory)

[56] References Cited
UNITED STATES PATENTS

| 1,046,944 | 12/1912 | Bartram | 137/625.68 |
| 2,713,989 | 7/1955 | Bryant | 251/324 |
| 2,782,801 | 2/1957 | Ludwig | 251/324X |
| 2,910,081 | 10/1959 | Karbowniczek | 137/625.68 |
| 3,199,540 | 8/1965 | Forster | 137/625.69 |
| 2,957,457 | 10/1960 | Rabjohn | 137/625.66 |

Primary Examiner—Henry T. Klinksiek
Attorney—Zachary T. Wobensmith, 2nd

ABSTRACT: A general purpose valve for supplying fluid including air under pressure selectively to one of two outlets which may be connected to two cylinders or the opposite ends of a cylinder and the construction of which includes a valve body with a single internal piston therein that may be positioned to permit fluid flow to either one of the outlets while the other is exhausted to a third outlet.

INVENTOR
JOHN G. KNOWLES
ATTORNEY

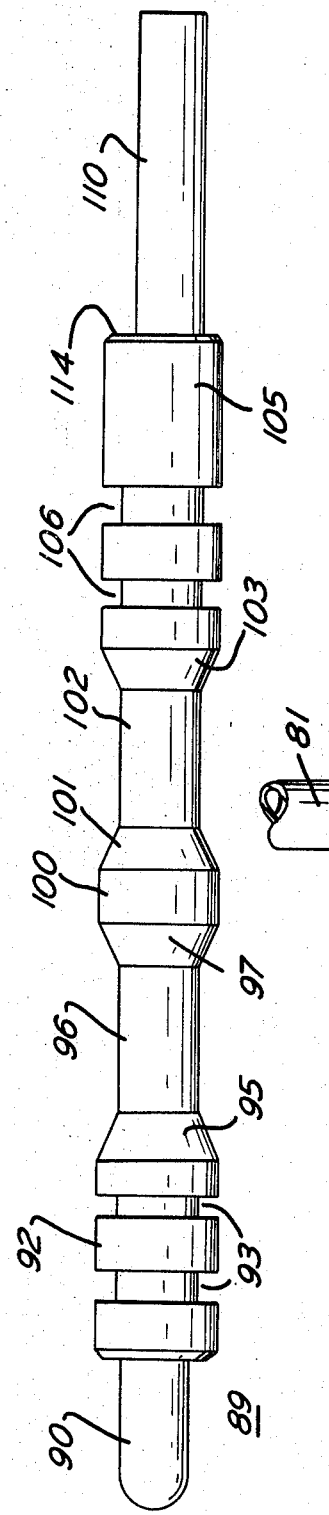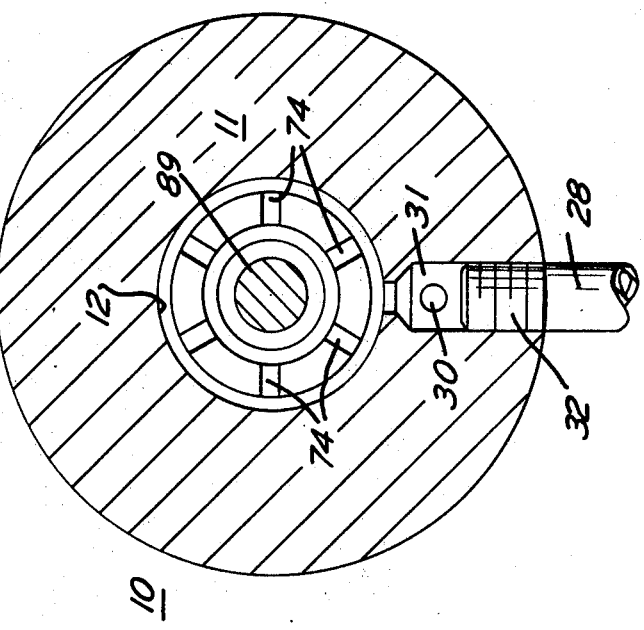

3,552,442

SECTIONAL SLEEVE VALVE

BACKGROUND OF THE INVENTION

1. Field of the Invention

This invention relates to a general purpose valve for supplying fluid under pressure selectively as desired to one of two outlets while the other outlet exhausts to a third outlet.

2. Description of the Prior Art

There have been many valves developed for supplying fluid under pressure to one of several outlets. Most of these valves suffer from complicated construction requiring complex valve bodies, multiple pistons and many parts which add to the initial cost, reduce operating efficiency, and require frequent maintenance.

The valve of the present invention is of simple construction and does not possess the shortcomings of other heretofore available valves.

SUMMARY OF THE INVENTION

In accordance with the invention a general purpose valve of simple construction is provided which includes an outer body with multiple split inner sleeves therein and a simple spring returned slidable piston carried within the sleeves which is capable of being positioned to permit fluid including air to flow under pressure to one of two outlets while the other outlet exhausts through a third outlet and with simple but effective sealing against leakage.

The principal object of the invention is to provide a valve that permits of readily supplying high-pressure fluid selectively to one of two outlets.

A further object of the invention is to provide a valve that contains a minimum of parts, is of simple construction, and which does not require machining to close tolerances.

A further object of the invention is to provide a valve that may be used with a variety of systems.

A further object of the invention is to provide a valve that has positive sealing and requires a minimum of maintenance.

BRIEF DESCRIPTION OF THE DRAWING

The nature and characteristic features of the invention will be more readily understood from the following description taken in connection with the accompanying drawings forming part thereof, in which:

FIG. 2 is a longitudinal view of the valve piston removed from the valve of FIG. 1; and FIG. 3 is a transverse sectional view taken approximately on the line 3—3 of FIG. 1.

Figure 1:
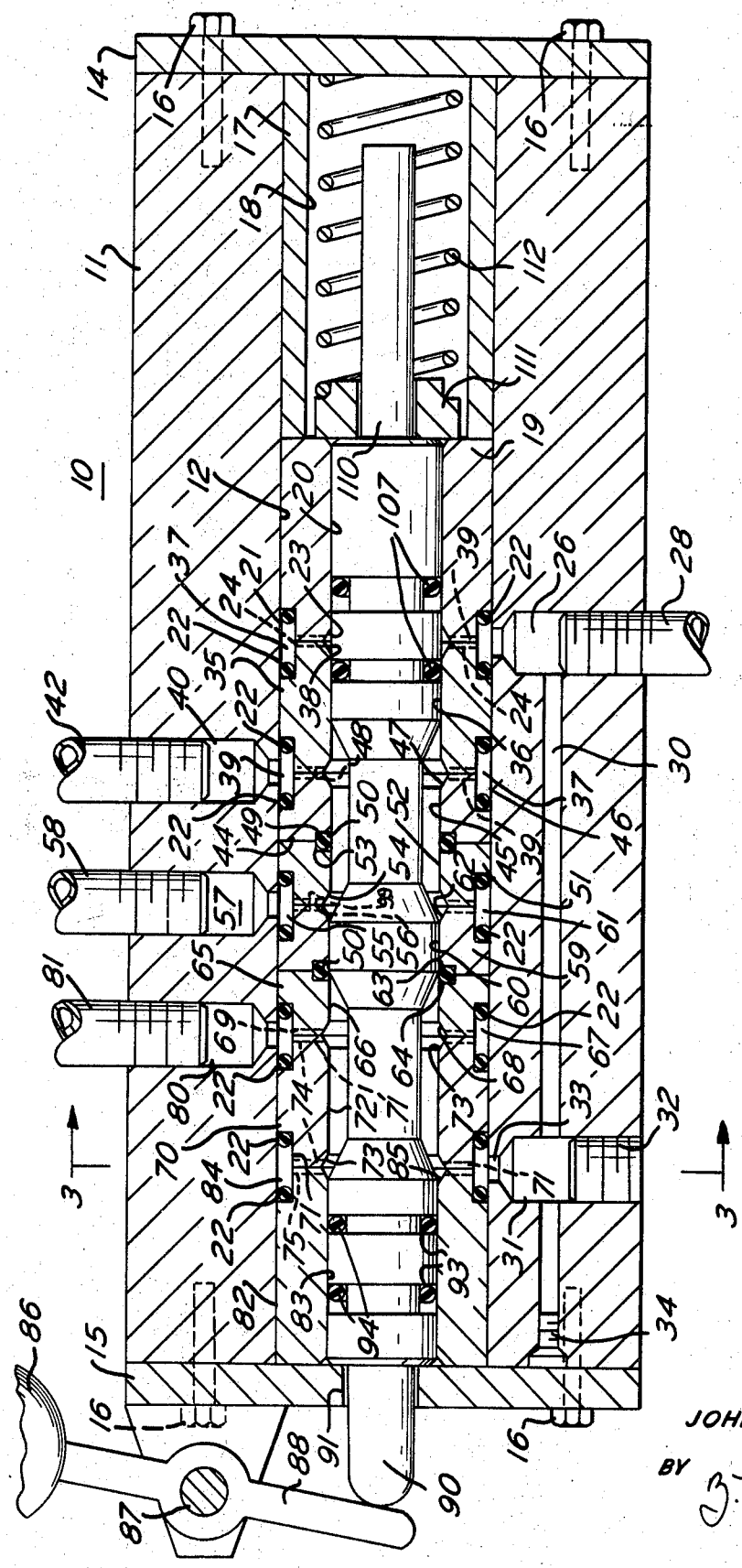
FIG. 1 is a longitudinal sectional view of the valve in accordance with the present invention.

It should, of course, be understood that the description and drawings herein are illustrative merely, and that various modifications and changes can be made in the structure disclosed without departing from the spirit of the invention.

DESCRIPTION OF THE PREFERRED EMBODIMENT

Referring now more particularly to the drawings, the valve 10 as there illustrated includes a cylindrical valve body 11 provided with a bore 12 therethrough and closed off at the ends by closure plates 14 and 15 held thereto by bolts 16.

Starting at the extreme right-hand end of valve 10 as seen in FIG. 1, the bore 12 has a hollow sleeve 17 therein with a bore 18 therein abutting the end plate 14. A hollow sleeve 19 is provided in bore 12 which abuts sleeve 17, the sleeve 19 having a bore 20 of lesser diameter than bore 18 and provided with an outer annular recess 21 in which a packing such as an O-ring 22 partially filling recess 21 is carried and which seals against valve body 11.

The sleeve 19 has a slight chamfer or bevel 23 at its end by recess 21 which extends outward to a plurality of radial outwardly extending grooves 24 communicating with the recess 21 and bore 20. At the bottom of valve body 11 and contiguous to recess 21 a vertical intake port 26 is provided extending therethrough which communicates with annular recess 21 and with a pipe 28 therein connected to a source of fluid under pressure (not shown).

A horizontal cylindrical passageway 30 is formed in body 11 connected to port 26 and extending to the left to vertical hole 31, the hole 31 may be connected to fluid under pressure but is shown as closed off by a threaded plug 32. The hole 31 extends inwardly to a smaller hole 33 which opens into bore 12. The passageway 30 continues to the left past hole 31 to plate 15 where it is closed off by a screw 34 engaged therein.

Adjacent to sleeve 19, a sleeve 35 is provided with bore 36 of the same diameter as bore 20 and with annular recesses 37 at each end with packings, such as O-rings 22 therein and an internal chamfer or bevel 38 at each end extending outwardly.

The sleeve 35 is provided with a plurality of radial outwardly extending grooves 39 corresponding to passageways 24 and communicating with bore 36 and with recesses 37.

A vertical outlet port 40 is provided in valve body 11 adjacent to recess 37 at the left of sleeve 35 and extending from bore 12 upwardly and outwardly with a pipe 42 therein which may be connected to a cylinder (not shown) to be operated.

To the left of sleeve 35, a sleeve 44 is provided with bore 45 of the same diameter as bore 36 and with an annular recess 46 identical to recess 37 and having a packing such as an O-ring 22 therein partially filling recess 46 and pressing against valve body 11.

The sleeve 44 has an internal chamfer 47 at the recess 46 end and a plurality of radial outwardly extending grooves 48 corresponding to passageways 39 in sleeve 35. The sleeve 44 terminates at the end opposite recess 46 with an inner groove 49 into which a sealing ring 50 is fitted.

A sleeve 51 abuts sleeve 44 with a bore 52 of the same diameter as bore 45 and having an inner groove 53 within which the ring 50 is also received. The sleeve 51 at the left has an internal chamfer 54 and is provided with an outer annular recess 55 into which a packing such as an O-ring is fitted.

The sleeve 51 is provided with a plurality of radial outwardly extending grooves 56 communicating with bore 52 and recess 55.

An exhaust port 57 is provided adjacent to recess 55 extending vertically upwardly with a threaded pipe 58 engaged therein and which may be connected to a supply tank (not shown) to permit of reuse of the fluid.

To the left of sleeve 51 a sleeve 59 is provided with bore 60 having the same diameter as bore 52, an annular outer recess 61 with a packing such as an O-ring 22 therein and an internal bevel or chamfer 62 on its right end facing sleeve 51. At the left of sleeve 59 an inner groove 63 is provided with an inner sealing ring 50 therein. The ring 50 is also received in a groove 64 in sleeve 65 which abuts sleeve 59 with bore 66, which is of the same diameter as bore 60 which sleeve 65 has an outer annular recess 67 within which a packing such as an O-ring 22 is provided. The sleeve 65 has an internal bevel or chamfer 68 at its left end and a plurality of radial outwardly extending grooves 69 communicating with bore 66 and the recess 67. A larger sleeve 70 is provided to left of sleeve 65 with an outer annular recess 71 at each end with packings such as O-rings 22 therein, with bore 72 of same diameter as bore 66 and with internal bevels or chamfers 73 at each end. The sleeve 70 has a plurality of radial outwardly extending grooves 74 at each end communicating with bore 72 and recesses 71.

A second outlet port 80 is provided extending vertically upwardly in body 11 above recesses 67 and 71 and with a pipe 81 therein connected as desired for supplying fluid under pressure.

To the left of sleeve 70 a sleeve 82 is provided with bore 83 of same diameter as bore 72 and with an outer annular recess 84 at its right end with an O-ring 22 therein and having an internal bevel or chamfer 85. The sleeve 82 abuts the end plate 15 and is provided with a plurality of radial outwardly extending grooves 75 contiguous to grooves 74. A crank 86 may be provided mounted to an extension of plate 15 by a pivot pin 87 and with an arm 88 which contacts a slidable piston 89 which is contained within the body 11 and within the sleeves 17, 19, 35, 44, 51, 59, 65, 70, and 82.

The piston 89 has an end extension 90 which passes through a hole 91 in plate 15 and contacts arm 88. To the right of extension 90 a cylindrical portion 92 is provided with two grooves 93 having packings such as O-rings 94 therein to prevent fluid leakage thereby. A frustoconical portion 95 adjoins cylindrical portion 92 and a reduced diameter cylindrical portion 96. A frustoconical portion 97 adjoins the portion 96 and an intermediate larger diameter cylindrical portion 100. A frustoconical portion 101 adjoins the intermediate portion 100 and also a reduced diameter cylindrical portion 102.

The cylindrical portion 102 has a frustoconical portion 103 adjoining it which expands to a larger diameter cylindrical portion 105. The cylindrical portion 105 is provided with two grooves 106 having O-rings 107 therein.

A reduced diameter shaft 110 is connected to cylindrical portion 105 and has a collar 111 slidably carried thereon. The collar 111 has a spring 112 bearing against it which spring 112 engages plate 14 and urges collar 111 to the left against face 114 on cylindrical portion 105.

The mode of operation and use will now be pointed out.

With piston 89 in the position shown in FIG. 1 fluid under pressure is introduced through pipe 28 into inlet port 26, the cylindrical portion 105 of piston 89 with O-rings 107 thereon prevents any flow through port 26. The fluid flows along passageway 30 into hole 31 and thence through hole 33 into recesses 71 and 84 and thence through grooves 74 and 75 into bore 72.

The fluid is constrained in bores 72 and 66 by contact of sealing ring 50 with intermediate portion 100 and by sealing ring 94 engaging bore 83 and can escape through grooves 69 and 74 into outlet 80 and thence through pipe 81 to the device (not shown) to be operated. At the same time outlet ports 40 and 57 are in communication through grooves 39, 48, 56 and 99 and bores 45 and 52 to permit of exhaust through port 58.

If it is desired to shift fluid to port 40 the crank arm 88 is moved about pin 87 to move piston 89 to the right against spring 112. Cylindrical portion 92 with O-rings 94 blocks flow through hole 33. Flow of fluid is now possible through port 26 into bore 36 and thence to port 40 and pipe 42 to the device (not shown) to be operated. The intermediate cylindrical portion 100 abuts sealing rings 50 to seal off port 40 from port 57. Fluid flow can then exhaust through port 80 through grooves 69, 74, bores 66 and 60 and grooves 56 and 99 to port 57 and pipe 58.

Switching of fluid flow back to pipe 81 can be resumed as desired.

I claim:

1. A valve which comprises:

an outer body having a longitudinal bore therein and a plurality of ports intersecting said bore for supply, delivery and exhaust of fluid;

a plurality of sleeves in alignment in said bore and having interior aligned bores;

members for retaining said sleeves in position;

certain of said sleeves having their meeting terminal ends provided with peripheral annular recesses aligned with said ports and having grooves connecting said recesses with the sleeve bores;

spaced packing members in said recesses for preventing fluid leakage along said body bore;

a piston member slidable in said aligned sleeve bores and having portions for controlling fluid flow with respect to said grooves;

certain of said sleeves having meeting terminal end portions intermediate said recessed ends and sleeve bore;

packing members in said sleeve bore at said last-mentioned meeting portions;

said piston member having end portions in sleeves at respective ends of said plurality of sleeves;

said piston member end portions having sleeve bore packing members carried thereby in engagement with the bores of said end sleeves for preventing fluid leakage along said piston; and said piston member end portions and said sleeve bores extending downstream of certain of said sleeve bore packing members to a greater extent than the longitudinal packing dimension to prevent packing member displacement by high to lower pressure action on said packing members.

2. A valve as defined in claim 1 in which said downstream extending piston member end portions and said sleeve bores so extend with respect to both said sleeve bore packing members.

3. A valve as defined in claim 2 in which said piston member has at its ends and intermediate its ends portions engaging said sleeve bores reduced diameter portions interposed respectively between said intermediate portion and said end portions for establishing communication respectively between said supply and a delivery port and said delivery port and said exhaust port.

4. A valve as defined in claim 3 in which:

certain of said sleeves have meeting terminal end portions intermediate said recessed ends;

packing members in said sleeve bores at said last mentioned terminal end portions; and said intermediate piston portion engages at least one of said last mentioned packing members.